Figures 5, 6:
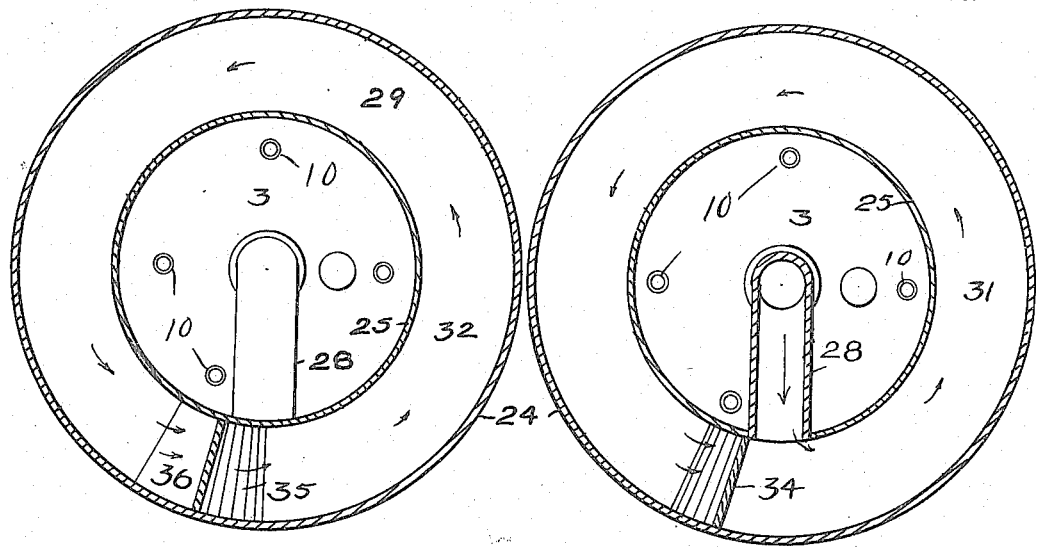
Figures 7, 8:
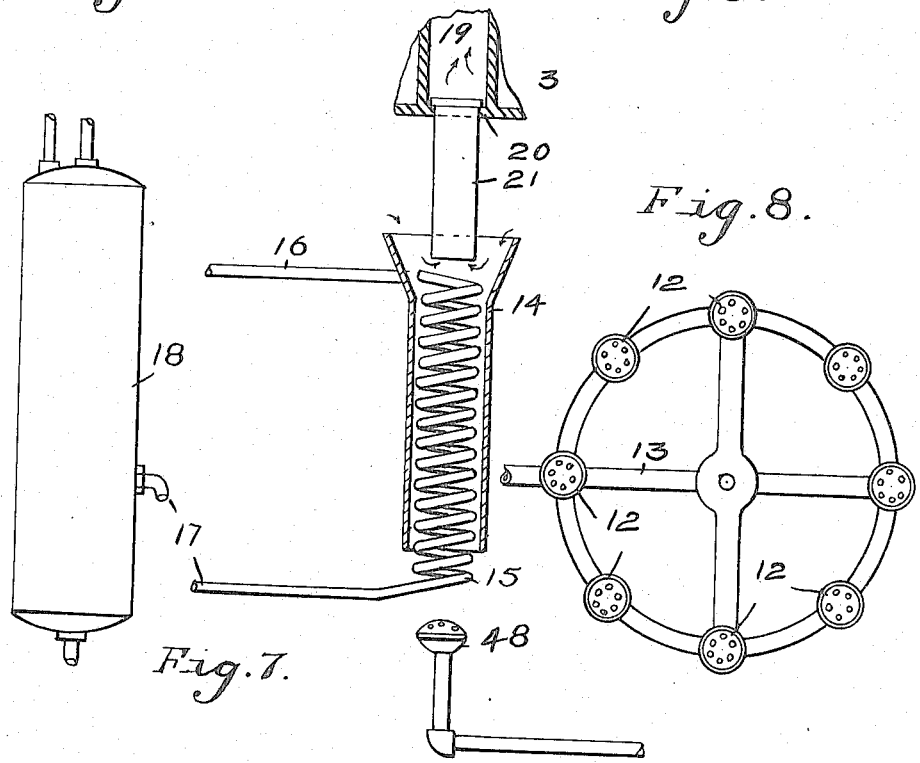
Figure 9:
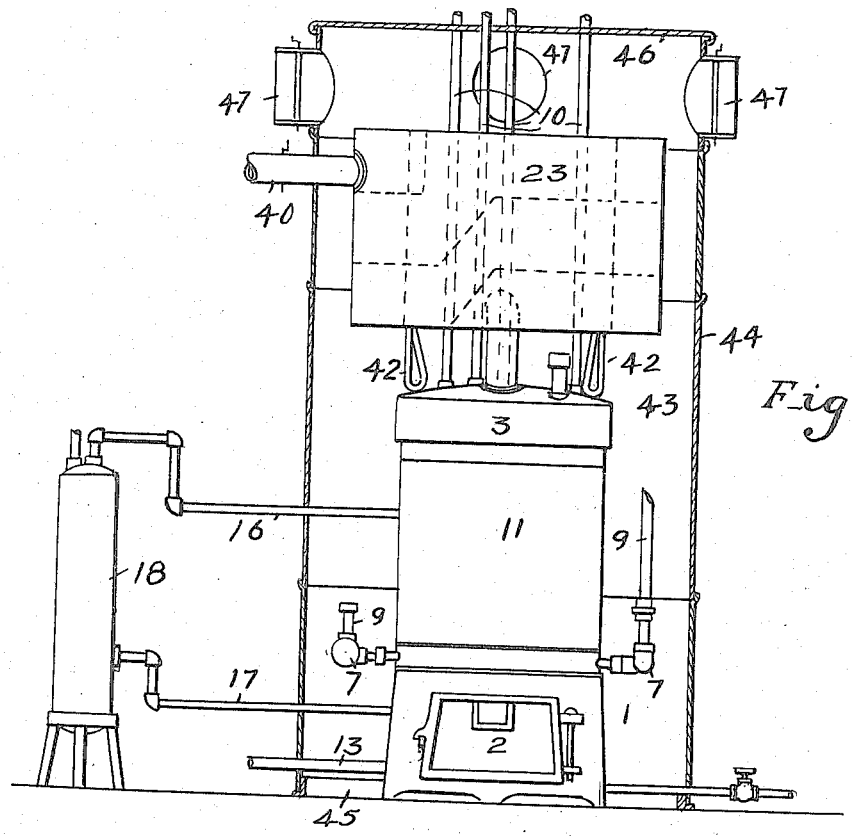

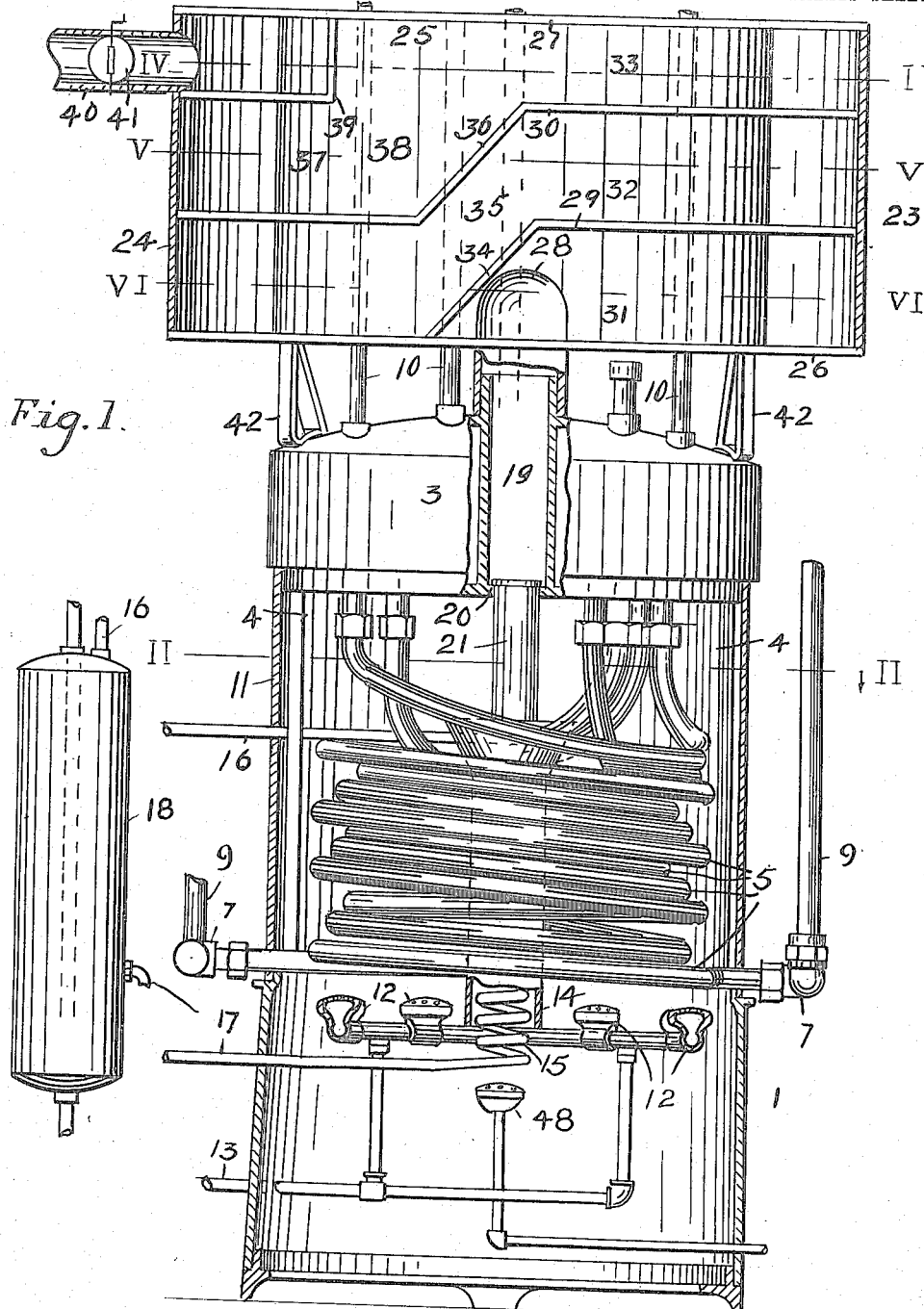

T. H. WARD & R. K. SEALS.
HEATING APPARATUS.
APPLICATION FILED APR. 13, 1914.
1,135,562.
Patented Apr. 13, 1915.
4 SHEETS—SHEET 2.
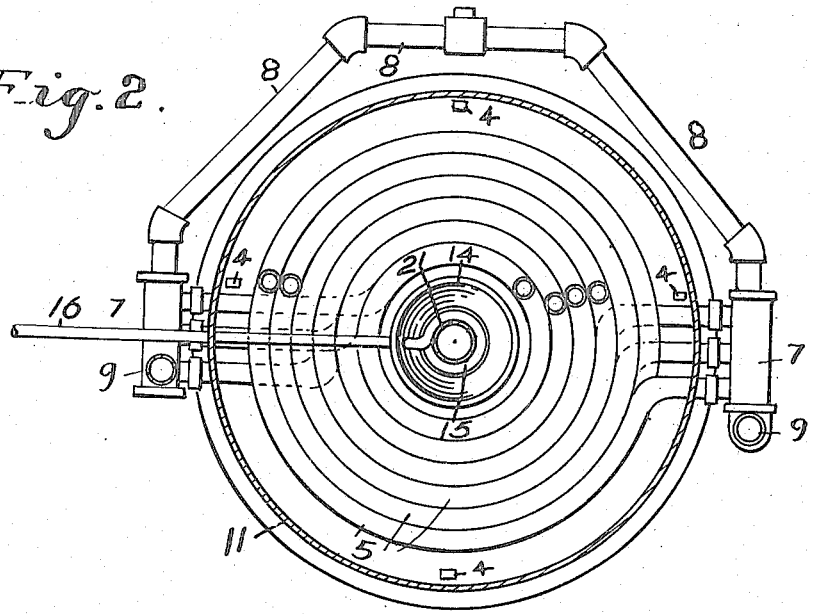
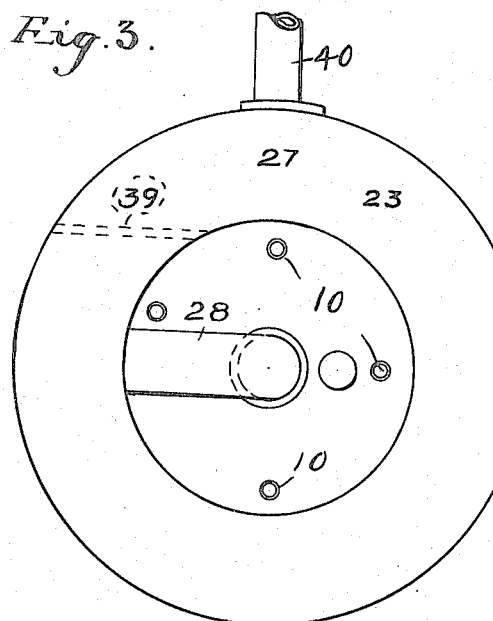
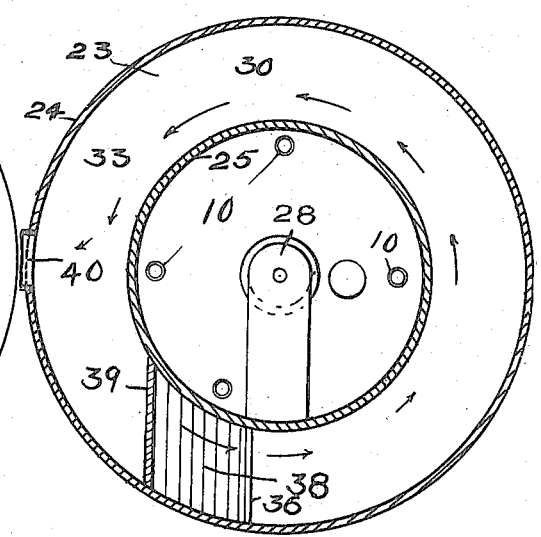

T. H. WARD & R. K. SEALS.
HEATING APPARATUS.
APPLICATION FILED APR. 13, 1914.

1,135,562.

Patented Apr. 13, 1915.
4 SHEETS—SHEET 3.

WITNESSES

INVENTORS
T. H. Ward
R. K. Seals
by F. N. Barber
ATTORNEY ns in JR, ex f pu 7 JR is JR ha JR ed JR 3, 2
UNITED STATES PATENT OFFICE.

THOMAS H. WARD AND RUFUS K. SEALS, OF CALIFORNIA, PENNSYLVANIA.

HEATING APPARATUS.

1,135,562.  Specification of Letters Patent.  Patented Apr. 13, 1915.

Application filed April 13, 1914. Serial No. 831,381.

*To all whom it may concern:*

Be it known that we, THOMAS H. WARD and RUFUS K. SEALS, citizens of the United States, both residing at California, in the county of Washington and State of Pennsylvania, have invented new and useful Improvements in Heating Apparatus, of which the following is a specification.

Our invention relates to apparatus for heating buildings with hot air or steam or hot water or any two of these methods or all of them.

It is the object of our invention to simplify existing heating apparatus known to us so that the consumption of fuel may be lessened and that more of the heat generated by the burners may be utilized.

Referring to the accompanying drawings, Figure 1 is a central vertical section of a heating apparatus constructed in accordance with the principles of our invention, parts thereof being shown in side elevation; Fig. 2 a horizontal section on the line II—II of Fig. 1; Fig. 3, a plan of the air heating drum; Fig. 4, a section of the line IV—IV of Fig. 1; Fig. 5, a section on the line V—V of Fig. 1; Fig. 6, a section on the line VI—VI of Fig. 1; Fig. 7, a detail of the water heating apparatus in connection with the flues for the products of combustion; Fig. 8, a plan of the burners; and Fig. 9, an elevation of our improved apparatus with the external jacket shown in vertical section.

On the drawings, 1 designates the vertical hollow base of our apparatus and contains the gas burners to be described presently. 2 is a door opening into the said space.

3 represents a hollow vertical steam-dome supported by the vertical rods 4 standing on the base 1.

5 designates a number of coils of pipe having their upper ends connected to the lower ends of the pipes 6 which are secured in the bottom of the steam-dome 3 and communicate with the interior thereof. The lower ends of the coils 5 are connected to the horizontal manifolds 7 lying at opposite sides of the coils. The rear ends of the manifolds are in communication by means of the series of pipes 8. Water is supplied to these manifolds by the vertical pipes 9 which constitute the lower end of the return system for the water or condensed steam from the radiators which are supplied with water or steam by means of the pipes 10 leading from the top of the steam-dome. We have not shown the house heating system of pipes and radiators which are connected to the pipes 9 and 10, as these are well known.

11 is a cylindrical drum or jacket surrounding the coils 5 and having its lower end supported by the base 1 and its upper end in engagement with the bottom of the steam-dome 3.

In the base 1 we provide a circular series of burners 12 supplied with gas through the pipe 13, these burners being located below the coils 5 so as to heat them most advantageously. Centrally located within the coils 5 is the vertical pipe or cylinder 14 containing the vertical water coil 15 having its upper and lower ends connected by the pipes 16 and 17 to the hot water boiler 18 in the usual or any desired manner.

The steam-dome has the central vertical flue 19 extending somewhat above the upper surface of the dome and provided at the lower end with the internal shoulder 20.

21 is a vertical pipe having at its upper end the flange 22 resting on the shoulder 20. The pipe 21 extends down into the flaring upper end of the pipe or cylinder 14. This construction prevents the hot products of combustion from passing directly from the coil chamber into the flue 19 and causes the said products to extend to the upper end of the coil chamber and then to curve down beneath the end of the pipe 21 before they can reach the flue 19.

23 represents an air heating radiator or drum. This drum has an outer cylinder 24 and an inner cylinder 25 concentric therewith. The space between the two cylinders 24 and 25 is closed by the bottom 26 and the top 27, thereby providing an annular chamber between the said cylinders and the top 27 and bottom 26, for the products of combustion.

28 represents an elbow-shaped flue which leads the products of combustion from the flue 19 through the cylinder 25 into the annular space between the cylinders 24 and 25 and near the bottom 26. The said annular space is divided by horizontal partitions 29 and 30 into three horizontal passages 31, 32, and 33. The passage 31 has one end closed by the partition 34 which connects the bottom 26 and partition 29. The other end of the passage is closed by the said partition 34 but communicates with the passage 32 by means of the space 35 left in the partition 29 adjacent to the partition 34. The end of the partition 29 not connected to the partition 34 is connected to the partition 30 by the partition 36. The partition 30 does not extend entirely around the radiator but terminates at the point 37 leaving a space 38 between the ends thereof so that the gases in the passage 32 may pass up into the passage 33. The passage 33 extends around the radiator from the passage 38 to the end partition 39. The smoke pipe 40 is connected to the passage 33 near the end partition 39.

41 indicates a damper in the smoke pipe 40. The radiator 23 is supported by the legs 42 on the top of the steam-dome.

If our invention is to be used as a steam and hot air heater water will be supplied to the lower portion of the apparatus leaving more or less space in the dome 3 for steam. The flames and hot gases from the burners 12 will circulate through the coils 5 and pass down into the flared portion of the pipe 14 and then up the pipes or flues 21, 19, and 28 into the passage 31, from which they pass through the passages 32 and 33 and into the smoke pipe 40. Steam passes up the pipes 10 to the radiators of the house heating system and the condensed steam returns to the manifolds through the pipes 9. More or less of the heat from the burners 12 passes outwardly through the jacket 11, the steam-dome 3 and through the radiator 23 into the space 43 inclosed by the cylindrical jacket 44 extending from the base-plate 45 to a short distance above the radiator 23, the upper end of the jacket 44 being provided with the cover 46. The hot air in the space 43 is led to the hot air registers of the house heating system through pipes connected to the hot air outlet pipes 47 which extend through the upper end of the jacket 44.

If our heating apparatus is to be used with a hot water heating system then the coils 5, the steam-dome 3, and the pipes 9 as well as all the other parts of the system will be filled with water.

Ordinarily when the burners 12 are in use the water coil 15 will be sufficiently hot to supply water to the boiler 18 for domestic use. But in the summer when the burners 12 are not in use the burner 48 will be lighted to heat the coil 15.

We claim—

1. In a heating apparatus, vertical water-heating coils, a dome located above the coils and having a central vertical flue through the same, the said coils being connected to the dome, a jacket constituting a combustion chamber and surrounding the coils and having its upper end closed by the steam dome, burners beneath the coils, an air heating drum, flue connections from the said flue to the interior of the drum, an outlet pipe connected to the drum, steam and water outlet pipes leading from the dome, and a jacket inclosing the first named jacket, the dome, and the drum, and provided with hot-air outlet connections.

2. In a heating apparatus, vertical water-heating coils, a hollow annular dome located above the coils and having a central vertical flue through the same forming the inner annular wall of the dome, the said coils being connected to the dome, a jacket surrounding the coils and having its upper end closed by the steam dome, burners beneath the coils, an air heating drum above the steam dome provided with a substantially spiral passage therein, flue connections from the said flue to one end of the said passage, an outlet pipe connected to the other end of the said passage, steam and water outlet pipes leading from the dome, and a jacket inclosing the first named jacket, the dome, and the drum, and provided with hot-air outlet connections.

3. In a heating apparatus, vertical water-heating coils, a dome located above the coils and connected to the coils, a jacket surrounding the coils and having its upper end closed by the dome, a vertical tube in the axis of the coils, a vertical water-heating coil therein, a burner beneath the said coil, a boiler to which the said coil is connected, a vertical flue through the dome for the products of combustion, and burners beneath the first named water heating coils.

4. In a heating apparatus, vertical water-heating coils, a vertical tube in the axis thereof, provided with a flaring upper end, burners beneath said coils, a dome above the coils having a vertical flue through the same, a jacket surrounding the coils and closed at the top by the dome, and a flue extending below the dome and into the flaring end of the said vertical tube and communicating with the said vertical flue.

5. In a heating apparatus, a hollow dome, water-heating coils connected to the same, and a jacket constituting a combustion chamber and surrounding the coils and capped by the dome, a vertical flue through the dome, and a flue to receive the products of combustion from the said vertical flue.

Signed at California, Pa., this 4th day of April, 1914.

THOMAS H. WARD.
RUFUS K. SEALS.

Witnesses:
J. A. WILLIAMS,
JOHN R. CHANNING,